United States Patent
Gore et al.

(10) Patent No.: US 10,678,535 B2
(45) Date of Patent: Jun. 9, 2020

(54) METHOD FOR UPDATING FIRMWARE OF UNASSIGNED DRIVES

(71) Applicant: DELL PRODUCTS L.P., Round Rock, TX (US)

(72) Inventors: Santosh Gore, Bangalore (IN); Sujit Jadhav, Bangalore (IN); Raveendra Madala, Bangalore (IN); Anusha Bhaskar, Bangalore (IN); Muniswamy Setty K S, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/987,036

(22) Filed: May 23, 2018

(65) Prior Publication Data

US 2019/0361695 A1    Nov. 28, 2019

(51) Int. Cl.
*G06F 9/445* (2018.01)
*G06F 8/654* (2018.01)

(52) U.S. Cl.
CPC .......... *G06F 8/654* (2018.02); *G06F 9/44589* (2013.01)

(58) Field of Classification Search
CPC . G06F 8/61; G06F 9/4411; G06F 8/60; G06F 8/62; H04L 29/08981
USPC .......................................................... 717/176
See application file for complete search history.

(56) References Cited

U.S. PATENT DOCUMENTS

| | | | |
|---|---|---|---|
| 6,715,031 B2 | 3/2004 | Camble et al. | |
| 7,454,487 B1 | 11/2008 | Becher et al. | |
| 7,640,325 B1 | 12/2009 | DeKoning et al. | |
| 8,468,515 B2 | 6/2013 | Chen et al. | |
| 9,183,158 B2 | 11/2015 | O'Loughlin et al. | |
| 2005/0033933 A1 | 2/2005 | Hetrick et al. | |
| 2013/0054874 A1 | 2/2013 | Myrah et al. | |
| 2016/0170841 A1 | 6/2016 | Yarnell et al. | |
| 2017/0010874 A1* | 1/2017 | Rosset | H04L 67/1097 |

FOREIGN PATENT DOCUMENTS

| | | |
|---|---|---|
| JP | 5249188 | 7/2013 |
| KR | 101003888 | 12/2010 |

* cited by examiner

*Primary Examiner* — Chuck O Kendall
(74) *Attorney, Agent, or Firm* — Jackson Walker LLP; Christopher J. Rourk

(57) ABSTRACT

A system for managing distributed data storage drives is disclosed that includes a plurality of computing devices, a plurality of data storage devices and an update system configured to determine whether one of the plurality of storage devices is associated with one of the plurality of computing devices, and to implement a firmware update to the storage device only if the storage device is not associated with one of the plurality of computing devices.

20 Claims, 2 Drawing Sheets

METHOD FOR UPDATING FIRMWARE OF UNASSIGNED DRIVES

TECHNICAL FIELD

The present disclosure relates generally to distributed network architectures, and more specifically to updating firmware of assigned and unassigned drives of a data storage array.

BACKGROUND OF THE INVENTION

Data storage arrays include a large number of data storage drives. When these drives are assigned to a computing device, firmware updates can be implemented using the computing device. However, unassigned drives will not receive firmware updates.

SUMMARY OF THE INVENTION

A system for managing distributed data storage drives is disclosed that includes a plurality of computing devices, a plurality of data storage devices and an update system configured to determine whether one of the plurality of storage devices is associated with one of the plurality of computing devices, and to implement a firmware update to the storage device only if the storage device is not associated with one of the plurality of computing devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
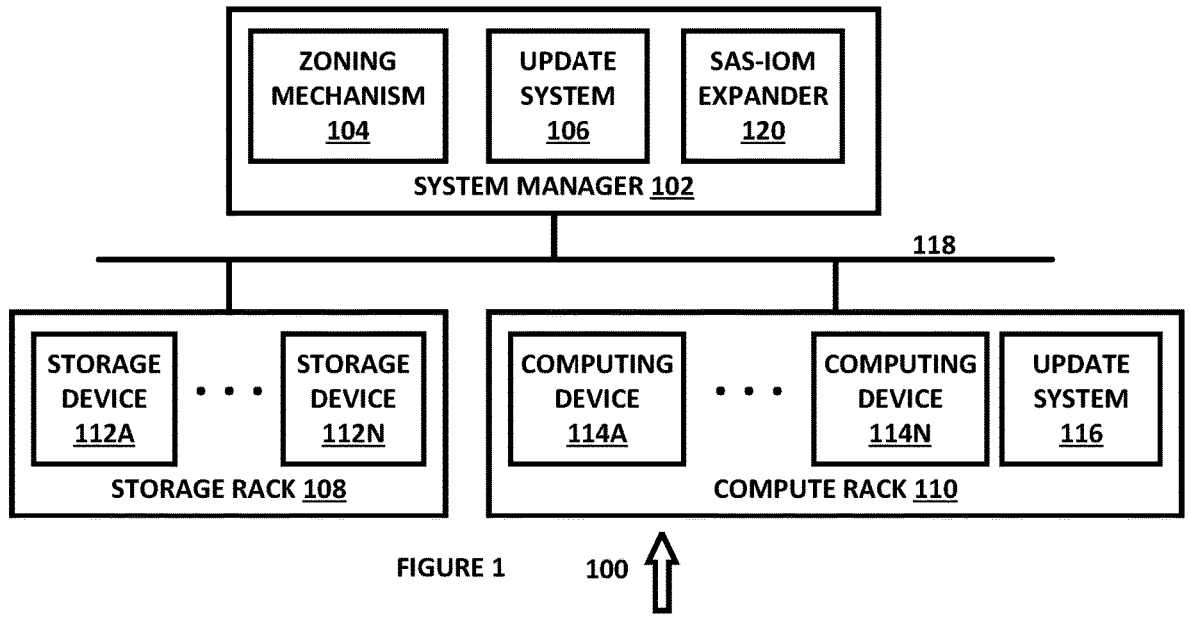
FIG. 1 is a diagram of a system for updating storage device firmware, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In some storage architectures, data storage can be provided by an array of storage devices that are shared with computing devices. A small computer system interface (SCSI) (SAS) input/output module (SAS-IOM) or other suitable system can be used to assign the storage devices to individual computing devices. A firmware update of these storage devices can be implemented from the assigned computing device, but when a drive is not assigned to any of the compute nodes, it cannot be updated in such an architecture. In addition, new storage devices that are installed in the array of storage devices also cannot be updated unless the storage device is subsequently assigned to a computing device. Likewise, if the computing device is removed, then any storage device that was assigned to it cannot be updated. As a result, there is no unified/uniform method for updating all the shareable storage devices.

A system and method for applying storage drive firmware updates from a system manager are disclosed that can operate in addition to the drive firmware update facility for the array of storage devices. The storage drive firmware can be updated when it is not assigned to a computing device, as well as when the computing device to which it is assigned has been removed or is otherwise unavailable. A unified interface for updating any sharable drive firmware from a system manager is also disclosed.

In one example embodiment, the drive firmware updates can be provided from a SAS-IOM expander using the SCSI, or other suitable systems. In this embodiment, the drive firmware update facility can be provided from a Dell storage sled (or other suitable storage device arrays) to which the drive is assigned or from the SAS IOM expander. The drive firmware can be updated in this manner when it is not assigned to a Dell compute sled (or other suitable computing device arrays) and when the Dell compute sled to which it is assigned is removed. A unified interface for updating any sharable drive firmware from a system manager is also disclosed.

One advantage of the disclosed embodiments is a method for applying a drive firmware update from an SAS IOM expander or other suitable devices. A uniform method for applying updating drive firmware is also disclosed, irrespective of any assignment to a compute sled, external storage enclosure attached to chassis or other associations. Another advantage is the ability to apply the drive firmware update even after the compute sled to which the drive is assigned is removed from the chassis. The disclosed embodiments enable the system administrator to prepare the drives with appropriate firmware even without assigning them to a compute sled, and provide a simplified interface for applying a drive firmware update when drives are shared with compute sleds. In addition, a uniform method for applying update of any sharable drive firmware is provided.

In one example embodiment, storage is provided by a storage sled, such as a Dell Insight storage array, and any external enclosure can also or alternatively be shared with compute nodes. An SAS IOM module or other suitable devices can be used to assign SAS drives in a Dell Insight sled or other suitable storage device arrays to various compute nodes. An SAS zoning mechanism can be used to associate drive bays/slots within enclosures/JBOD ("just a bunch of discs") to Dell compute nodes/sleds or other suitable computing devices. Firmware update of these drives can be done from the Dell compute sled update interfaces or other suitable devices.

The present disclosure can be used to address problems, such as 1) when data storage drives that are not assigned to any of the compute nodes cannot be updated, 2) when new drives that are inserted to storage sled/enclosure from unassigned slot cannot be updated, such as when it can only be updated when the drive is assigned to a compute sled, 3) if the compute node is removed for some reason and the drives assigned to it cannot be updated, 4) if there is no unified/uniform method for updating all the sharable drives, 5) when the computing node is removed for some reason, then the data from drives cannot securely erased, or in other suitable circumstances.

A method for applying the drive firmware updates from a storage IOM expander is disclosed that can be used alone or in addition to the drive firmware update facility from the storage sled to which it is assigned. A detailed solution for providing the drive firmware update when it is not assigned to a compute sled and when the compute sled to which it is assigned is removed is also provided. A unified interface for updating any sharable drive firmware from a system manager is also disclosed.

In one example embodiment, a user initiates a sharable drive firmware update from a multi-systems module (MSM) or other suitable systems or devices, where the MSM or other systems/devices can be implemented as a special purpose processor with algorithmic firmware that operates in conjunction with other distributed processors and drives. The MSM checks whether the drive is assigned to any processor, such as a processor of a compute sled. If the drive is assigned to any processor, the MSM checks whether the compute sled is present or not. If the compute sled is present then the update can be performed using any of the suitable compute sled update interfaces. Otherwise, drive update is initiated using the SAS IOM expander or other suitable systems that are special purpose processors, such as by using an algorithm and a general purpose processor to create a special purpose processor to provide the technical advantage of allowing all drives in the distributed architecture to be maintained with the most current version of the firmware for the drives, even where the drives include a plurality of different drives in a plurality of different configurations. The SAS IOM expander or other suitable system fetches the firmware update using provided details, such as by reading a drive SCSI device vital product data (VPD) page and determining the update method with that data or other suitable data. The firmware update is then initiated using the SCSI interface or other suitable processes. The drive/disk or other suitable systems or devices can verify the checksum and signature of the firmware, and if the image is not valid, it can be determined that the update is failed. If it is determined that the image is valid, the drive/disk or other suitable device applies the firmware. The SAS IOM expander or other suitable devices or systems can check the update status and inform the user via the MSM, or in other suitable manners. A unified interface is also disclosed for applying firmware for any sharable drive (such as any drive available in a storage sled (such as a Dell Insight system), an external enclosure or other suitable systems), such as using an MSM and a SAS IOM expander or other suitable systems.

FIG. 1 is a diagram of a system 100 for updating storage device firmware, in accordance with an example embodiment of the present disclosure. System 100 includes system manager 102, zoning mechanism 104, update system 106, storage rack 108, compute rack 110, storage devices 112A through 112N, computing devices 114A through 114N, update system 116, SAS-IOM expander 120 and network 118, each of which can be implemented in special purpose hardware, special purpose software in combination with special purpose hardware.

System manager 102 provides management and control for a distributed computing environment, such as for large rack-mounted servers, blade servers, data storage device arrays and other suitable devices that can be dynamically allocated to different entities, applications or other suitable applications. System manager 102 tracks device operation and configuration, generates management and administrator reports and performs other suitable functions as may be needed for control of the components of the distributed computing environment.

Zoning mechanism 104 can be implemented as a serial attached small computer system interface (SCSI) (SAS) input/output module (IOM) zoning mechanism that associates drive bays or slots within enclosures or other drive arrays with computing devices in computing device nodes. In one example embodiment, zoning mechanism 104 tracks the association of components in a distributed computing environment, such as to identify specific computing devices that are associated with specific data storage devices.

Update system 106 is configured to update firmware of one or more associated storage device 112A through 112N. In one example embodiment, update system 106 can receive firmware update source data, such as a network resource address where the firmware is stored or other suitable data, and can retrieve the firmware update from the source. Update system 106 can also read vital product data (VPD) from a device, can determine an update method from the VPD data (such as based on the VPD data or from data associated with one or more fields of the VPD data), can transmit firmware image data to a drive using SCSI commands, can verify a checksum and signature of the firmware, can determine whether the firmware image is valid, can activate the firmware on the data storage device and can perform other suitable functions.

Storage rack 108 is a special purpose hardware device that provides input and output connections and systems for a plurality of storage devices 112A through 112N. In one example embodiment, storage rack 108 provides power, monitoring and other infrastructure support systems for individual data storage devices, and other suitable functions.

Compute rack 110 is a special purpose hardware device that provides input and output connections and systems for a plurality of computing devices 114A through 114N. In one example embodiment, compute rack 110 provides power, monitoring and other infrastructure support systems for individual computing devices, and other suitable functions.

Storage devices 112A through 112N are individual data storage devices that are configured to provide data storage services for one or more associated computing devices 114A through 114N and other suitable functions. In one example embodiment, storage devices 112A through 112N can be Dell EMC All-Flash storage devices, Dell EMC Software-Defined Storage (SDS) or other suitable data storage devices that are configured to be dynamically paired with one or more computing devices.

Computing devices 114A through 114N are individual computing devices that are configured to provide computing services and other suitable functions. In one example embodiment, computing devices 114A through 114N can be Dell PowerEdge devices or other suitable computing devices that are configured to be dynamically paired with one or more data storage devices and other suitable devices.

Update system 116 is configured to update firmware of one or more associated storage device 112A through 112N. In one example embodiment, update system 106 can receive firmware update source data, such as a network resource address where the firmware is stored or other suitable data, and can retrieve the firmware update from the source. Update system 106 can also read vital product data (VPD) from a device, can determine an update method from the VPD data (such as based on the VPD data or from data associated with one or more fields of the VPD data), can transmit firmware image data to a drive using SCSI commands, can verify a checksum and signature of the firmware, can determine whether the firmware image is valid, can activate the firmware on the data storage device and can perform other suitable functions.

Network 118 can be a local area network, a wide area network, a wireless network, a wireline network, an optical network, other suitable networks, a combination of networks or other suitable communications media.

Figure 2:
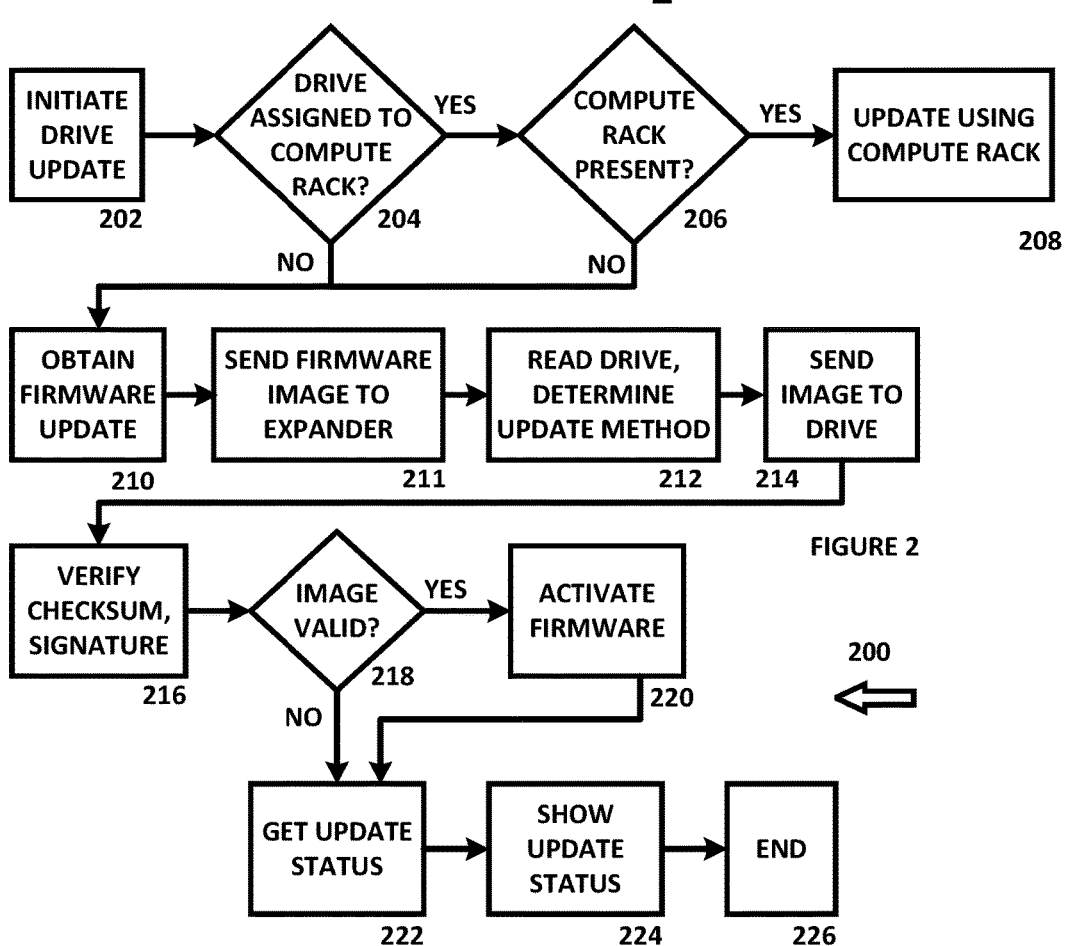
FIG. 2 is a diagram of an algorithm for updating firmware, in accordance with an example embodiment of the present disclosure.

FIG. 2 is a diagram of an algorithm 200 for updating firmware, in accordance with an example embodiment of the present disclosure. Algorithm 200 can be used to transform a general purpose computing platform into a special purpose computing platform, and can be implemented in hardware or a suitable combination of hardware and software.

Algorithm 200 begins at 202, where a drive update is initiated. In one example embodiment, a user can activate a user control, which can then be processed by algorithm 200 to initiate a drive update, such as a firmware update or other suitable updates. In another example embodiment, a drive update can be initiated as part of a housekeeping process, an enterprise maintenance process or in other suitable manners. The algorithm them proceeds to 204.

At 204, it is determined whether the drive has been assigned to a compute rack. In one example embodiment, data storage drives can be assigned to processing equipment in a rack of processing equipment, such as a blade server of a blade server rack or blade server "farm." Likewise, a determination of whether the drive has been assigned to some other processor or group of processors can be determined, or other suitable determinations can be made. If it is determined that the drive has not been assigned to a compute rack at 204, the algorithm proceeds to 210, otherwise the algorithm proceeds to 206.

At 206, it is determined whether the compute rack is present. In one example embodiment, the drive can be present in a drive rack, and if the compute rack is not present, then the drive can still be updated using algorithm 200. For example, the compute rack might be out of service, damaged, powered down or other conditions may exist that prevent the compute rack from performing the update. If it is determined that the compute rack is not present, the algorithm proceeds to 210, otherwise the algorithm proceeds to 208.

At 208, the drive is updated using an update process performed by the compute rack. In one example embodiment, the compute rack can include an update system that is configured to update firmware of data storage drives and other associated peripherals, and that update system can be used if it is available. After the update is completed, the algorithm terminates.

At 210, if it has been determined that a drive is not assigned to a compute rack, or that a compute rack associated with an assigned drive is not present or is operationally unavailable, the algorithm obtains the firmware for the drive update. In one example embodiment, the firmware update can be obtained from a predetermined location for firmware updates associated with the drive, or other suitable processes can also or alternatively be used. The algorithm then proceeds to 211.

At 211, the algorithm sends the drive firmware image to SAS-IOM expander or other suitable systems, such as by using a Redfish interface provided by SAS-IOM or in other suitable manners. An MSM module or other suitable systems can download drive firmware and send it to SAS-IOM module, which can update drive firmware using SCSI interface or in other suitable manners. The algorithm then proceeds to 212.

At 212, the drive is read to determine an update method. In one example embodiment, the device vital product data page can be queried using the SCSI interface or in other suitable manners. The algorithm then proceeds to 214.

At 214, the firmware update image is sent to the drive for installation. In one example embodiment, the firmware update image is provided in accordance with the vital product page data to allow the firmware update image to be installed. The algorithm then proceeds to 216.

At 216, the checksum and signature for the update is verified. In one example embodiment, the drive performs a checksum and signature verification, or other suitable processes can also or alternatively be used. The algorithm then proceeds to 218, where it is determined whether the image is valid. If it is determined that the image is valid, the algorithm proceeds to 220 where the firmware is activated, otherwise the algorithm proceeds to 222. Likewise, after the firmware is activated at 220, the algorithm proceeds to 222.

At 222, the update status is obtain, and the algorithm then proceeds to 224 where the update status is displayed to a user, such as allow a user to confirm that the update has been successfully completed. The algorithm then proceeds to 320 and terminates.

In operation, algorithm 200 allows the firmware of a data storage drive to be updated either using the update system of a compute rack or the update system of a system manager or other suitable devices or systems. While algorithm 200 has been shown in flowchart format, object-oriented programming, state diagrams, ladder diagrams or other suitable programming paradigms can also or alternatively be used to implement algorithm 200.

Figure 3:
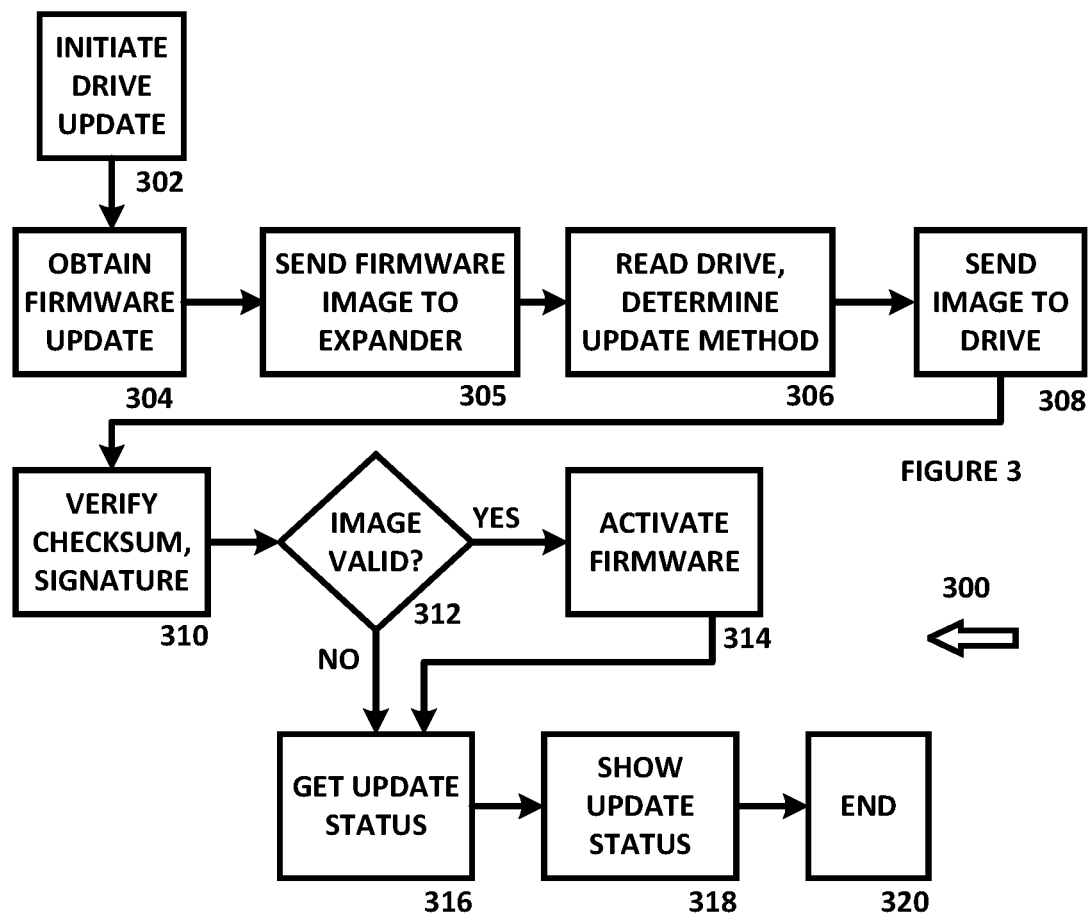
FIG. 3 is a diagram of an algorithm for updating firmware, in accordance with an example embodiment of the present disclosure.

FIG. 3 is a diagram of an algorithm 300 for updating firmware, in accordance with an example embodiment of the present disclosure. Algorithm 300 can be used to transform a general purpose computing platform into a special purpose computing platform, and can be implemented in hardware or a suitable combination of hardware and software.

Algorithm 300 begins at 302, where a drive update is initiated. In one example embodiment, a user can activate a user control, which can then be processed by algorithm 300 to initiate a drive update, such as a firmware update or other suitable updates. In another example embodiment, a drive update can be initiated as part of a housekeeping process, an enterprise maintenance process or in other suitable manners. The algorithm them proceeds to 304.

At 304, the algorithm obtains the firmware for the drive update. In one example embodiment, the firmware update can be obtained from a predetermined location for firmware updates associated with the drive, or other suitable processes can also or alternatively be used. The algorithm then proceeds to 305.

At 305, the algorithm sends the drive firmware image to SAS-IOM expander or other suitable systems, such as by using a Redfish interface provided by SAS-IOM or in other suitable manners. An MSM module or other suitable systems can download drive firmware and send it to SAS-IOM module, which can update drive firmware using SCSI interface or in other suitable manners. The algorithm then proceeds to 306.

At 306, the drive is read to determine an update method. In one example embodiment, the device vital product data page can be queried using the SCSI interface or in other suitable manners. The algorithm then proceeds to 308.

At 308, the firmware update image is sent to the drive for installation. In one example embodiment, the firmware update image is provided in accordance with the vital product page data to allow the firmware update image to be installed. The algorithm then proceeds to 310.

At 310, the checksum and signature for the update is verified. In one example embodiment, the drive performs a checksum and signature verification, or other suitable processes can also or alternatively be used. The algorithm then proceeds to 312, where it is determined whether the image is valid. If it is determined that the image is valid, the algorithm proceeds to 314 where the firmware is activated, otherwise the algorithm proceeds to 316. Likewise, after the firmware is activated at 314, the algorithm proceeds to 316.

At 316, the update status is obtain, and the algorithm then proceeds to 318 where the update status is displayed to a user, such as allow a user to confirm that the update has been successfully completed. The algorithm then proceeds to 320 and terminates.

In operation, algorithm 300 allows the firmware of a data storage drive to be updated using the update system of a system manager or other suitable devices or systems. While algorithm 300 has been shown in flowchart format, object-oriented programming, state diagrams, ladder diagrams or other suitable programming paradigms can also or alternatively be used to implement algorithm 300.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one example embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth example embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an example order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:
1. A system for managing distributed data storage drives comprising:
a plurality of computing devices;
a plurality of data storage devices; and an update system configured to determine whether one of the plurality of storage devices is associated with one of the plurality of computing devices, and to implement a firmware update to the storage device only if the storage device is not associated with one of the plurality of computing devices, and further comprising means to determine whether a drive is assigned to a compute rack.

2. The system of claim 1 wherein the update system is associated with a zoning mechanism, and determines whether the storage device is associated with one of the plurality of computing devices by querying the zoning mechanism.

3. The system of claim 1 further comprising a second update system configured to implement the firmware update to the storage device only if the storage device is associated with one of the plurality of computing devices.

4. The system of claim 1 wherein the update system is configured to determine whether one of the plurality of storage devices is associated with one of the plurality of computing devices, and to implement a firmware update to the storage device only if the storage device is not associated with one of the plurality of computing devices or the associated computing device is not operable.

5. The system of claim 1 further comprising means to determine whether a drive is assigned to a compute rack after a drive update is initiated.

6. The system of claim 1 further comprising means to determine whether a drive is assigned to a compute rack and to obtain a firmware update if it is determined that the drive is not assigned to a compute rack.

7. The system of claim 1 further comprising means to determine whether a drive is assigned to a compute rack and to determine whether the compute rack is present if it is determined that the drive is assigned to a compute rack.

8. The system of claim 1 further comprising means to obtain a firmware update.

9. The system of claim 1 further comprising means to obtain a firmware update if it is determined that the drive is not assigned to a compute rack.

10. The system of claim 1 further comprising means to obtain a firmware update if it is determined that the drive is not assigned to a compute rack or that the drive is assigned to the compute rack but that the compute rack is not operable.

11. The system of claim 1 further comprising means to read a drive and determine an update method.

12. The system of claim 1 further comprising means to read a drive and determine an update method after obtaining a firmware update.

13. The system of claim 1 further comprising means to read a drive and determine an update method before sending a firmware image to the drive.

14. The system of claim 1 further comprising means to verify a checksum and signature of a firmware image.

15. The system of claim 1 further comprising means to verify a checksum and signature of a firmware image after receiving the firmware image at the storage device.

16. The system of claim 1 further comprising means to verify a checksum and signature of a firmware image prior to determining whether the firmware image is valid.

17. The system of claim 1 further comprising means to determine whether a firmware image is valid.

18. The system of claim 1 further comprising means to determine whether a firmware image is valid after verifying a checksum and signature of the firmware image.

19. The system of claim 1 further comprising means to determine whether a firmware image is valid prior to activating the firmware image at the storage device.

20. A system for managing distributed data storage drives comprising:
    a plurality of computing devices;
    a plurality of data storage devices; and
    an update system separate from the plurality of computing devices and configured to determine whether one of the plurality of storage devices is assigned to one of the plurality of computing devices, and to implement a firmware update to the storage device without one of the plurality of computing devices only if the storage device is not assigned to one of the plurality of computing devices and to update the storage device using the associated computing device if the update system determines that the storage device is assigned to the computing device, and further comprising means to determine whether a drive is assigned to a compute rack.

* * * * *